United States Patent [19]
Eldin et al.

[11] Patent Number: 5,332,781
[45] Date of Patent: Jul. 26, 1994

[54] STORAGE-STABLE SUSPENSION OF TOUGHENERS IN EPOXY RESIN HARDENERS

[75] Inventors: Sameer H. Eldin, Courtepin; Robert P. Peyer, Lausen, both of Switzerland; Frans Setiabudi, Bad Krozingen, Fed. Rep. of Germany

[73] Assignee: Ciba-Geigy Corporation, Ardsley, N.Y.

[21] Appl. No.: 80,797

[22] Filed: Jun. 22, 1993

[30] Foreign Application Priority Data

Jun. 25, 1992 [CH] Switzerland ............... 2008/92-3

[51] Int. Cl.$^5$ .................. C08L 51/04; C08L 9/04; C08L 13/02; C08L 63/02
[52] U.S. Cl. .................... 525/65; 525/113; 525/114; 525/502; 525/529; 525/530; 525/531
[58] Field of Search ............. 523/407; 525/65, 301, 525/113, 114, 502, 529, 530, 531

[56] References Cited

U.S. PATENT DOCUMENTS

| | | | |
|---|---|---|---|
| 4,082,895 | 4/1978 | Backderf et al. | 525/65 |
| 4,778,851 | 10/1988 | Henton et al. | 525/65 |
| 4,841,010 | 6/1989 | Dodiuk | 525/113 |
| 5,075,379 | 12/1991 | Storey et al. | 525/113 |
| 5,177,122 | 1/1993 | Shih | 523/407 |

FOREIGN PATENT DOCUMENTS

| | | |
|---|---|---|
| 0189048 | 7/1986 | European Pat. Off. |
| 0449776 | 10/1991 | European Pat. Off. |
| WO87/00188 | 1/1987 | PCT Int'l Appl. |
| 415045 | 12/1966 | Switzerland |

*Primary Examiner*—Robert E. Sellers
*Attorney, Agent, or Firm*—William A. Teoli, Jr.

[57] ABSTRACT

Storage-stable suspension comprised of a solid or liquid epoxy resin hardener and a solid or liquid toughener suspended therein is distinguished by excellent homogeneous dispersion of the toughener in the epoxy resin hardener and are suitable for preparing suspensions of curable epoxy resin compositions.

7 Claims, No Drawings

STORAGE-STABLE SUSPENSION OF TOUGHENERS IN EPOXY RESIN HARDENERS

The present invention relates to a storage stable-suspension comprised of a hardener for epoxy resins and a toughener suspended therein, and to curable epoxy resin compositions comprising as hardener a storage-stable suspension of an epoxy hardener and a toughener suspended therein.

It is known to add tougheners, for example core/shell polymers, to curable epoxy resin compositions to improve the toughness properties of the mouldings made from said compositions. When using solid tougheners it is very important that their dispersion in the epoxy resin composition should be as homogeneous as possible for them to be fully effective. The particle size of the solid tougheners is also a factor to be taken into account. The homogenisation of the components of an epoxy resin composition is normally effected by simple stirring. The homogeneity of the epoxy resin compositions obtained will vary in accordance with the stirring operation and the stirring time. As electron micrographs of such compositions have shown, the solid tougheners are present in the form of agglomerates. A typical example of the procedure currently employed is disclosed in EP-A-0 189 048, wherein a curable epoxy resin composition which may contain a butadiene-styrene-acrylonitrile copolymer as core/shell polymer toughener is prepared.

The epoxy resin compositions disclosed in EP-A-0 449 776 comprising a toughener, for example a core/shell polymer, a carboxylic anhydride hardener and a compound containing two reactive hydrogen atoms, are mixed e.g. by preparing firstly a suspension of the epoxy resin and the toughener, and then mixing said suspension with a specific hardener mixture.

It has how been found that by suspending a toughener in an epoxy resin hardener it is possible to obtain a storage-stable suspension in which the toughener is homogeneously dispersed in the form of very fine particles in the submicron range, i.e. the average particle size of the toughener in the suspension is $10^{-6}$ m, preferably smaller than $10^{-6}$ m. With such storage-stable suspensions it is possible to achieve a more homogeneous dispersion of the components so that a certain consistency of quality with respect to homogeneity is ensured.

Accordingly, the invention relates to storage-stable suspensions comprised of a solid or liquid epoxy resin hardener and a solid or liquid toughener suspended therein.

The novel storage-stable suspensions can be prepared using the customary hardeners for epoxy resins, typically dicyandiamide, polycarboxylic acids, polycarboxylic anhydrides, polyamines, polyaminoamides, amino group-containing adducts of amines and polyepoxide compounds as well as polyols.

Suitable polycarboxylic acids for the above suspensions are typically aliphatic polycarboxylic acids such as maleic acid, oxalic acid, succinic acid, nonyl- or dodecylsuccinic acid, glutaric acid, adipic acid, pimelic acid, suberic acid, azelaic acid or dimerised or trimerised linoleic acid, cycloaliphatic polycarboxylic acids such as tetrahydrophthalic acid, methylendomethylenetetrahydrophthalic acid, hexachloroendomethylenetetrahydrophthalic acid, 4-methyltetrahydrophthalic acid, hexahydrophthalic acid, or 4-methylhexahydrophthalic acid, or aromatic polycarboxylic acids such as phthalic acid, isophthalic acid, terephthalic acid, trimellitic acid, pyromellitic acid or benzophenone-3,3',4,4'-tetracarboxylic acid, as well as the of these polycarboxylic acids.

Polyamines suitable for use in the novel suspensions are aliphatic, cycloaliphatic, aromatic or heterocyclic amines, including ethylenediamine, 1,2-propanediamine, 1,3-propanediamine, N,N-diethylethylenediamine, hexamethylenediamine, diethylenetriamine, triethylentetramine, tetraethylenepentamine, N-(2-hydroxyethyl)-, N-(2-hydroxypropyl)-and N-(2-cyanoethyl)-diethyltriamine, 2,2,4-trimethyl-1,6-hexanediamine, 2,3,3,-trimeth-yl-1,6hexanediamine, N,N-dimethyl- and N,N-diethyl-1,3-propanediamine, ethanolamine, m- and p-phenylenediamine, bis(4-aminophenyl)methane, aniline-formaldehyde resins, bis(4-aminophenyl)sulfone, m-xylylenediamine, bis(4-aminocyclohexyl)methane, 2,2-bis(4-aminocyclohexyl)propane, 2,2-bis(4-amino-3-methylcyclohexyl)propane, 3-aminomethyl-3,5,5-trimethylcyclohexylamine (isophoronediamine) and N-(2-aminoethyl)piperazine, and, as polyaminoamides, typically those from aliphatic polyamines and dimerised or trimerised fatty acids.

Aliphatic polyols suitable for use in the novel suspensions are typically ethylene glycol, diethylene glycol and higher poly(oxyethylene) glycols, 1,2-propanediol or poly(oxypropylene) glycols, 1,3-propanediol, 1,4-butanediol, poly(oxytetramethylene) glycols, 1,5-pentanediol, 1,6-hexanediol, 2,4,6-hexanetriol, glycerol, 1,1,1-trimethylolpropane, pentaerythritol or sorbitol.

Aromatic polyols suitable for use in the novel suspensions include mononuclear phenols such as resorcinol, hydroquinone, N,N-bis(2-hydroxyethyl)aniline, or polynuclear phenols, such as p,p'-bis(2-hydroxyethylamino)diphenylmethane, bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl)propane, 2,2-bis(3,5-dibromo-4-hydroxyphenyl)propane, as well as novolaks obtainable by condensation of aldehydes, typically formaldehyde, acetaldehyde, chloral or furfuraldehyde, with phenols such as phenol, or with phenols which are substituted in the nucleus by chlorine atoms or $C_1$–$C_9$alkyl groups, for example 4-chlorophenol, 2-methylphenol, or 4-tert-butylphenol, or by condensation with bisphenols, such as those of the indicated type.

Catalytic hardeners can also be used for preparing the novel suspensions, typically tertiary amines such as 2,4,6-tris(dimethylaminoethyl)phenol and other Mannich bases, N-benzyldimethylamine and triethanolamine; alkali metal alkoxides of alcohols, typically the sodium alcoholate of 2,4-dihydroxy-3-hydroxymethylpentane; tin salts of alkanoic acids, typically tin octanoate; Friedel-Crafts catalystors such as boron trifluoride and the complexes and chelates thereof which are obtained by reacting boron trifluoride with e.g. 1,3-diketones. When using catalytic hardeners, they are preferably suspended in the toughener, preferably using 0.1 to 10 parts by weight of curing catalyst per 10 parts by weight of toughener.

Mixtures of hardeners can also be used for the novel suspensions, provided they do not react with one another.

The novel suspensions preferably contain a liquid epoxy resin hardener.

Among the epoxy resin hardeners, the polycarboxylic anhydrides and polyamines are further preferred for preparing the novel suspensions. It is most preferred to use liquid polycarboxylic anhydrides and liquid polyamines for the preparation of the novel suspensions.

Suitable accelerators can also be used for curing the epoxy resin compositions. Typical examples of such accelerators when using dicyandiamide, polyaminoamides, polycarboxylic acids and their anhydrides are tertiary amines or the salts thereof, quaternary ammonium compounds or alkali metal alkoxides.

Tougheners suitable for use in the novel storage-stable suspensions are the elastomers or elastomer-containing graft polymers known to those skilled in the art as rubber tougheners, provided they form a second dispersed phase in a cured epoxy resin composition. The tougheners may also be solid or liquid in the initial state.

Liquid tougheners form a homogeneous phase with the epoxy resin hardeners in the novel suspensions. Exemplary of such liquid tougheners are the carboxyl- and amine-terminated butadiene/acrylonitrile copolymers disclosed, inter alia, in EP-A-0-245 018, as well as the core/shell polymers disclosed in EP-A-0-045 357 and in US-A-4 419 496.

In particular, the novel suspensions contain a solid toughener. Solid tougheners have the advantage that the particle size and the amount of toughener phase in the suspension are predetermined. When using liquid tougheners, the requisite second phase does not form until during the cure with the epoxy resin.

The preferred solid tougheners used in the practice of this invention contain no reactive groups which are able to react with the reactive groups of the epoxy resin hardener.

The liquid tougheners also contain no reactive groups which can react with the reactive groups of the epoxy resin hardener. In this case, for example, carboxyl-terminated butadiene/acrylonitrile polymers are used with a carboxylic anhydride hardener and amine-terminated butadiene/acrylonitrile polymers are used with an amine hardener.

Graft polymers are typically methacrylate/butadiene-styrene polymers, acrylate-methacrylate/butadiene-styrene polymers or acrylonitrile/butadiene-styrene polymers.

Core/shell polymers normally have a soft core of an elastomeric material which is insoluble in the epoxy resin matrix. Grafted thereon is a shell of polymeric material which may have a reactive as well as a nonreactive functionality with epoxy groups. The core/shell polymer may also be a so-called multi-core/shell polymer, conveniently one having the structure soft core, hard shell, soft shell and hard shell. Such polymers are disclosed, inter alia, in GB-A-2 039 496.

Examples of elastomers which may be used as core material are polybutadiene, polyacrylates and polymethacrylates and their co- or terpolymers, typically with polystyrene, polyacrylonitrile or polysulfide.

The core material preferably contains polybutadiene or polybutylacrylate.

Typical examples of polymeric shell materials are polystyrene, polyacrylonitrile, polyacrylate and polymethacrylate mono-, co- or terpolymers or styrene/acrylonitrile/glycidyl methacrylate terpolymers.

It is preferred to use polymethyl methacrylate as shell material.

The size of such core/shell particles is conveniently 0.05 to 30 μm, preferably 0.05 to 15 μm. It is preferred to use core/shell particles having a size smaller than 1 μm.

Preferred core/shell polymers are those having a shell that does not react with epoxy groups.

The core/shell polymers can be prepared by the method described in U.S. Pat. No. 4,419,496 or EP-A-0 045 357.

It is preferred to use core/shell polymers which contain a core of polybutadiene, polybutadiene/polystyrene or polybutyl acrylate. In the case of polybutadiene, the core material is preferably partially crosslinked. Further core materials are polyacrylates and polymethacrylates quite generally, preferably polymethyl acrylates and polymethyl methacrylates.

The shell consists preferably of polymers based on methyl methacrylate, cyclohexyl methacrylate, butyl acrylate, styrene or methacrylonitrile.

The amount of toughener in the novel suspensions containing epoxy resin hardeners is preferably 5 to 80% by weight, most preferably 10 to 50% by weight, based on the epoxy resin hardener.

The novel suspensions can be prepared either by a) when using a water-sensitive hardener, adding a suitable organic solvent to the aqueous emulsion of a toughener, removing the water as an azeotrope by vacuum distillation, then adding the epoxy resin hardener and removing the residual solvent by vacuum distillation, or b) when using a water-insensitive hardener, adding the aqueous emulsion of a toughener which contains or does not contain an organic solvent to the liquid or fused epoxy resin hardener, and removing the water and any organic solvent present by vacuum distillation.

The novel suspensions may also contain the standard fillers of epoxy resin technology, typically: mineral and fibrous fillers such as quartz powder, fused silica, alumina, glass powder, mica, kaolin, dolomite, graphite, carbon black as well as carbon fibres and textile fibres. Preferred fillers are quartz powder, fused silica, alumina or dolomite.

The novel storage-stable suspensions comprising an epoxy resin hardener and a toughener suspended therein are suitable in simple and practical manner for the preparation of epoxy resin compositions in which the toughener is homogeneously dispersed, which compositions may also be in the form of suspensions. From the processing aspect, the novel suspensions may be regarded as a simple means of preparing curable epoxy resin compositions in which a toughener present therein is homogeneously dispersed. In addition, the preparation of such epoxy resin compositions makes it possible to achieve a certain consistency of quality in advantageous manner.

Accordingly, the invention also relates to a suspension of an epoxy resin composition, comprising a) an epoxy resin containing on average more than one 1,2-epoxide group per molecule, and b) a storage-stable suspension of an epoxy resin hardener and a toughener suspended therein.

The customary epoxy resins of epoxy resin technology may be used as epoxy resin component a) of the novel storage-stable suspensions. Typical examples of epoxy resins are:

I) Polyglycidyl and poly($\beta$-methylglycidyl) esters which are obtainable by reacting a compound containing at least two carboxyl groups in the molecule and epichlorohydrin or $\beta$-methylepichlorohydrin. The reaction is conveniently carried out in the presence of a base.

Compounds containing at least two carboxyl groups in the molecule may suitably be aliphatic polycarboxylic acids. Examples of such polycarboxylic acids are oxalic acid, succinic acid, glutaric acid, adipic acid, pimelic acid, suberic acid, azelaic acid or dimerised or trimerised linoleic acid. It is, however, also possible to use cycloaliphatic polycarboxylic acids such as tetrahydrophthalic acid, 4-methyltetrahydrophthalic acid, hexahydrophthalic acid or 4-methylhexahydrophthalic acid. Aromatic polycarboxylic acids can also be used, typically phthalic acid, isophthalic acid and terephthalic acid.

II) Polyglycidyl or poly($\beta$-methylglycidyl) ethers which are obtainable by reacting a compound containing at least two free alcoholic hydroxyl groups and/or phenolic hydroxyl groups and epichlorohydrin or $\beta$-methylepichlorohydrin, under alkaline conditions or in the presence of an acid catalyst and subsequent treatment with an alkali.

The glycidyl ethers of this type are typically derived from acyclic alcohols, typically from ethylene glycol, diethylene glycol and higher poly(oxyethylene) glycols, 1,2-propanediol or poly(oxypropylene) glycols, 1,3-propanediol, 1,4-butanediol, poly(oxytetramethylene) glycols, 1,5-pentanediol, 1,6-hexanediol, 2,4,6-hexanetriol, glycerol, 1,1,1-trimethylolpropane, pentaerythritol, sorbitol, as well as from polyepichlorohydrins. They may also be derived from cycloaliphatic alcohols such as 1,4-cyclohexanedimethanol, bis(4-hydroxycyclohexyl)methane or 2,2-bis(4-hydroxycyclohexyl)propane, or they contain aromatic nuclei such as N,N-bis(2-hydroxyethyl)aniline or p,p'-bis(2-hydroxyethylamino)diphenylmethane.

The glycidyl ethers may also be derived from mononuclear phenols, typically from resorcinol or hydroquinone, or they are derived from polynuclear phenols such as bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl)propane, 2,2-bis(3,5-dibromo-4-hydroxyphenyl)propane, as well as from novolaks obtainable by condensation of aldehydes such as formaldehyde, acetaldehyde, chloral or furfuraldehyde, with phenols such as phenol, or with phenols which are substituted in the nucleus by chlorine atoms or $C_1$–$C_9$alkyl groups, for example 4-chlorophenol, 2-methylphenol or 4-tert-butylphenol, or by condensation with bisphenols of the type cited above.

III) Poly-(N-glycidyl) compounds obtainable by dehydrochlorination of the reaction products of epichlorohydrin with amines which contain at least two amino hydrogen atoms. These amines are typically aniline, n-butylamine, bis(4-aminophenyl)methane, m-xylylenediamine or bis(4-methylaminophenyl)methane.

The poly(N-glycidyl) compounds also include triglycidyl isocyanurate, N,N'-diglycidyl derivatives of cycloalkylene ureas such as ethylene urea or 1,3-propyleneurea, and diglycidyl derivatives of hydantoins, typically of 5,5-dimethylhydantoin.

IV) Poly(S-glycidyl) compounds, preferably bis(S-glycidyl) derivatives which are derived from dithiols such as 1,2-ethanediol or bis(4-mercaptomethylphenyl) ether.

V) Cycloaliphatic epoxy resins, including bis(2,3-epoxycyclopentyl) ether, 2,3-epoxycyclopentyl glycidyl ether, 1,2-bis(2,3-epoxycyclopentyloxy)ethane or 3,4-epoxycyclohexylmethyl-3',4'-epoxycyclohexanecarboxylate.

It is also possible to use epoxy resins in which the 1,2-epoxy groups are attached to different hetero atoms or functional groups. These compounds typically comprise the N,N,O-triglycidyl derivative of 4-aminophenol, the glycidyl ether-glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

It is preferred to use epoxy resins having an epoxy value of 2 10 equivalents/kg which are glycidyl ethers, glycidyl esters or N-glycidyl derivatives of aromatic, heterocyclic, cycloaliphatic or aliphatic compounds.

Particularly preferred epoxy resins are the diglycidyl ether of bisphenol A, the diglycidyl ether of bisphenol F, the diglycidyl ether of bisphenol S,N,N,O-triglycidyl-m-aminophenol, N,N,O-triglycidyl-p-aminophenol or N,N,N',N'-tetraglycidyldiaminodiphenylmethane.

Further optional hardeners may be added for curing the novel storage-stable suspensions of components (a) and (b).

The novel epoxy resin compositions are prepared by per se known methods, conveniently using known mixing aggregates such as stirrers, kneaders, roll mills or, in the case of solid substances, in dry mixers.

The epoxy resin compositions are cured to mouldings or the like in the standard known manner of epoxy resin technology, for example as described in the "Handbook of Epoxy Resins", 1967, by H. Lee and K. Neville.

The novel epoxy resin compositions are admirably suitable for use as casting resins, laminating resins, moulding materials, coating materials and as coating system for electrical and electronic components, preferably as casting resins and coating systems for electrical and electronic components.

EXAMPLE 1

Preparation of a carboxylic anhydride/toughener suspension a) Preparation of a toughener from a core/shell polymer: 202.7 g of polybutadiene latex (BL 2004K, sold by Bayer AG), having solids content of 59.2%, and 397.3 g of deionised water are placed, under nitrogen, in a 1 litre ground glass flask equipped with double jacket, glass anchor stirrer, thermometer, condenser, rotary thermostat and gas inlet, and stirred at 100 rpm. The mixture is heated to 80° C.±1° C. After about 55 minutes (min), the internal temperature is 80° C. Then the dropwise addition of 120.0 g of distilled methyl methacrylate (purum, sold by Fluka, Switzerland) and a solution of 4.0 g of potassium peroxide disulfate and 3.5 g of sodium dodecylbenzenesulfonate in 110 ml of distilled water is commenced. After 3.5 hours (h), a homogeneous white emulsion is obtained. After altogether 6 h and 10 min, the addition of methyl methacrylate and of the initiator is complete.

Stirring is continued for a further 2 h at 80° C. At the end of this time, 3 ml of a 20% emulsion of n-octadecyl 3-(3,5-di-tert-butyl-4-hydroxyphenyl)propionate are added to the homogeneous white emulsion, and the entire batch is then cooled to room temperature (RT). The emulsion is likewise homogeneous and white at RT. It is filtered through glass wool. No agglomerates are present. The emulsion is diluted to 815 g, corresponding to a solids content of 29.4%. The emulsion so obtained is used as toughener.

b) 200 g of the core/shell polymer emulsion obtained in Example 1a) and 400 ml of methyl isobutyl ketone are placed in a 1 litre ground flask flask equipped with stirrer, thermometer, vacuum connection, water separator and a rotary thermostat. At an outside temperature (TA) of 140° C., about 140 ml of water are distilled off at 86° C. over 2 h. Then about 150 ml of methyl isobutyl ketone are distilled off. The water separator is removed and a conventional distillation unit is mounted. Then 528.61 g of methyltetrahydrophthalic anhydride (low viscosity, with a viscosity of 50–100 mPa.s at 25° C.) are added to the emulsion and the batch is rinsed with a minor amount of methyl isobutyl ketone. At a TA of 110° C., a reaction temperature (TI) of 100° C. and a pressure of 215–250 mbar, the bulk of the solvent is removed by distillation. The remainder of the solvent is removed over a further hour at 110/30 mbar, giving a very fine suspension of the core/shell polymer in the liquid methyltetrahydrophthalic anhydride with the following properties:

| viscosity (Epprecht) at 25° C.: | 125 mPa.s |
| --- | --- |
| anhydride content: | 10.80 equivalents/kg. |

EXAMPLE 2

Preparation of a polyamine/toughener suspension a) A core/shell emulsion is prepared as described in Example 1a). The solids content of the emulsion is 28.75%.

b) 3,3'-Dimethyl-4,4'-diaminodicyclohexylmethane are placed in the apparatus described in Example 1b), and 565.2 g of the core/shell emulsion obtained according to Example 2a) are run in with constant stirring. Water is distilled off at 80°–90 C. and under a vacuum of 40 mbar, giving a homogeneous, almost transparent emulsion which becomes slightly waxy at RT and has the following properties:

| viscosity (Epprecht) at 40° C.: | 670 mPa.s |
| --- | --- |
| amine content: | 6.80 equivalents/kg. |

EXAMPLE 3

Preparation of a polyamine/toughener suspension a) A core/shell emulsion is prepared as described in Example 1a). The solids content of the emulsion is 29.8%.

b) 335.6 g of the core/shell emulsion prepared according to Example 3a) and 269.0 g of 4,4'-diaminodiphenylmethane (solid, m.p. 88°–92° C.) are placed in a reactor and the mixture is heated without stirring. At a TI of 62° C., the mixture is cautiously stirred until the 4,4'-diaminodiphenylmethane is suspended. Then a vacuum of c. 600 mbar is applied, and at a TI of 106° C. the 4,4'-diaminodiphenylmethane is fused and the suspension is readily stirrable. At a TI of 112° C./620 mbar the water begins to distill and at a TI of 123° C. the vacuum is increased stepwise up to 330 mbar. At a TI of 126° C. and a vacuum of 35 mbar, almost all the water is distilled off, giving a homogeneous, pale brown, moderately viscous suspension which is subsequently dried for 5 min under a high vacuum. The brown homogeneous substance is poured on to coated paper and, after solidifying and crystallising out, is mechanically comminuted in a mixer to give 367.2 g of a powder with an amine content of 7.41 equivalents/kg.

EXAMPLE 4

Preparation of a carboxylic anhydride/toughener suspension a) A core/shell emulsion is prepared as described in Example 1a). The solids content of the emulsion is 27.95%.

b) A core/shell/hardener suspension is prepared as described in Example 1b), using 300 g of of methyltetrahydrophthalic anhydride, 268.3 g of the core/shell emulsion and 600 ml of toluene instead of 400 ml of methyl isobutyl ketone. A low visosity suspension of the core/shell polymer in liquid methyltetrahydrophthalic anhydride is obtained in the ratio of 25:100 with the following properties:

| viscosity (Epprecht) at 40° C.: | 1840 mPa.s |
| --- | --- |
| anhydride content: | 4.63 equivalents/kg. |

EXAMPLE 5

Preparation of a carboxylic anhydride/toughener suspension a) A core/shell emulsion is prepared as described in Example 1a). The solids content of the emulsion is 27.5%.

b) The procedure of Example 1b) is carried out, but using 500 g of methylhexahydrophthalic anhydride as liquid anhydride and 454.6 g of the core/shell emulsion. A low viscosity suspension of the core/shell polymer in liquid methyltetrahydrophthalic anhydride is obtained in the ratio of 25:100 with the following properties:

| viscosity (Epprecht) at 40° C.: | 1902 mPa.s |
| --- | --- |
| anhydride content: | 4.57 equivalents/kg. |

EXAMPLE I 100 g of a liquid diglycidyl ether of bisphenol A having an epoxy value of 5.25–5.4 equivalents/kg and a viscosity of 11 000–13 000 mPa.s at 25° C. are well stirred with 75 g of the carboxylic anhydride/toughener suspension of Example 1. The mixture is poured into a mould and, after evacuation of trapped air bubbles, fully cured for 6 h at 120° C. and for 12 h at 140° C. The mouldings are tested for the following properties:

| glass transition temperature (TMA*) = | 149° C. |
| --- | --- |
| fracture toughness (DIN 51 221) = | 294 J/m$^2$ |
| impact strength (ISO 197/1D) = | 40 kJ/m$^2$ |

*thermomechanical analyzer

EXAMPLE II

A mixture of 80 g of N,N,N',N'-tetraglycidyl-4,4'-diaminodiphenylmethane, 10 g of a liquid diglycidyl ether of bisphenol A with an epoxy value of 5.4 equivalents/kg and 10 g of the diglycidyl ether of 1,4-butanediol is well stirred with 68 g of the polyamine/toughener suspension of Example 2. The mixture is poured into a mould and, after evacuation of trapped air bubbles, fully cured for 1.25 h at 160° C. and for 2 h at 180° C. The mouldings are tested for the following properties:

| | |
|---|---|
| glass transition temperature (TMA) = | 200° C. |
| fracture toughness (DIN 51 221) = | 177 J/m² |

EXAMPLE III 100 g of a solid diglycidyl ether of bisphenol A with an epoxy value of 2.60 equivalents/kg are placed in a vessel and fused on a hot plate at 100° C. Then 50 g of the carboxylic anhydride/toughener suspension of Example 4 are added to the melt and the mixture is homogenised for 3 minutes at 80° C. Then 4.34 g of a masterbatch prepared from 21.5 g of methyltetrahydrophthalic anhydride and 0.24 g of N-benzyldimethylamine at 60° C. are added and the mixture is homogenised for 5 minutes. Then 200 g of quartz powder (quartz powder W 12 sold by Quartzwerke Frechen) are stirred in at 80° C. in increments. The entire mixture is subsequently homogenised for 5 minutes and evacuated for 10 minutes under a pressure of 1 mbar, with stirring. The melt is poured into moulds and cured for 16 hours at 140° C. in a recirculating air oven. The mouldings are tested for the following properties:

| | |
|---|---|
| glass transition temperature (DSC**) = | 116° C. |
| fracture toughness (DIN 51 221) = | 874 J/m² |
| impact strength (ISO 197/1D) = | 14 kJ/m² |

**DSC = differential scanning calorimeter

EXAMPLE IV 35 g of methyltetrahydrophthalic anhydride and 1 g of N-benzyldimethylamine are placed in a vessel and, with stirring, heated to 50° C. on a hot plate over about 5 minutes. Then 50 g of the carboxylic anhydride/toughener suspension of Example 4 are blended in and the mixture is heated for 5 minutes to 60° C. With stirring, 100 g of a liquid epoxy resin mixture with an epoxy value of 3.05-3.6 equivalents/kg, consisting of 91 parts by weight of the diglycidyl ether of bisphenol A and 9 parts by weight of the diglycidyl ether of polypropylene glycol (400), and then 279 g of fine quartz powder (quartz powder W 12) are added to the mixture, which is then heated to 80° C. The mixture is subsequently degassed for 10 minutes under a pressure of 1 mbar. The melt is poured into moulds and cured for 2 hours at 100° C. and for 16 hours at 140° C. The mouldings are tested for the following properties:

| | |
|---|---|
| glass transition temperature (DSC) = | 115° C. |
| fracture toughness (DIN 51 221) = | 563 J/m² |
| impact strength (ISO 197/1D) = | 10 kJ/m² |

EXAMPLE V 55.3 g of methyltetrahydrophthalic anhydride and 0.5 g of N-benzyldimethylamine are placed in a vessel and, with stirring, heated to 50° C. on a hot plate over about 5 minutes. Then 50 g of the carboxylic anhydride/toughener suspension of Example 5 are blended in and the mixture is heated for 5 minutes to 60° C. With stirring, 100 g of the diglycidyl ether of hexahydrophthalic acid with an epoxy value of 5.95 equivalents/kg, and then 308 g of fine quartz powder (quartz powder W 12EST, sold by Quartzwerke Frechen) are added to the mixture, which is then heated to 80° C. The mixture is subsequently degassed for 10 minutes under a pressure of 1 mbar. The melt is poured into moulds and cured for 2 hours at 100° C. and for 16 hours at 140° C. The mouldings are tested for the following properties:

| | |
|---|---|
| glass transition temperature (DSC) = | 120° C. |
| fracture toughness (DIN 51 221) = | 605 J/m² |
| impact strength (ISO 197/1D) = | 9 kJ/m² |

What is claimed is:

1. A storage-stable suspension consisting of a solid or liquid epoxy resin hardener and homogeneously dispersed therein particles of a toughener which does not contain groups that react with the hardener wherein the suspension is subsequently mixed with an epoxy resin.

2. A suspension according to claim 1, which comprises a liquid epoxy resin hardener.

3. A suspension according to claim 1, wherein the epoxy resin hardener is a polycarboxylic anhydride or a polyamine.

4. A suspension according to claim 3, which comprises a liquid polycarboxylic anhydride or a liquid polyamine.

5. A suspension according to claim 1, wherein the solid toughener is a graft polymer.

6. A suspension according to claim 1, wherein the solid toughener is a graft polymer.

7. A suspension according to claim 5, wherein the graft polymer is a core/shell polymer.

* * * * *